G. L. MELTON.
NUT LOCK.
APPLICATION FILED JULY 11, 1917. RENEWED SEPT. 25, 1919.
1,358,690.
Patented Nov. 9, 1920.
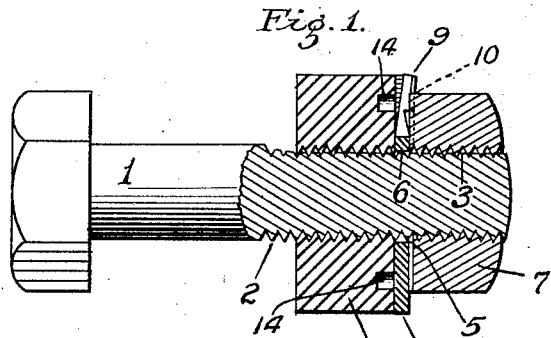
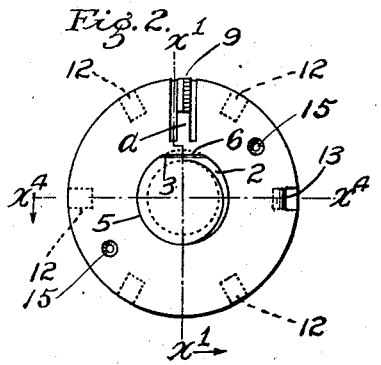
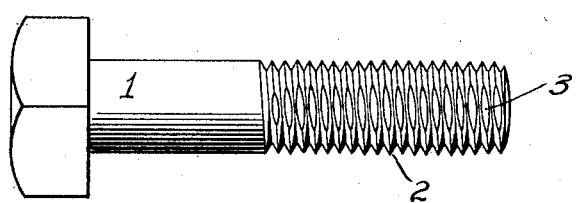
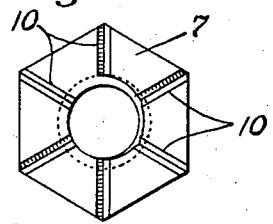
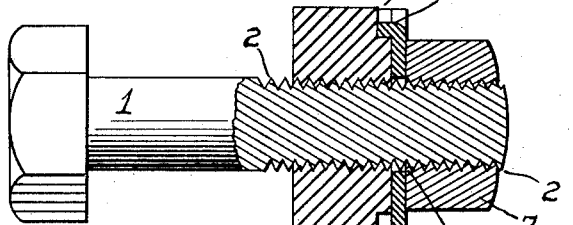
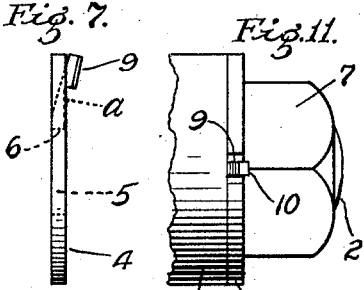
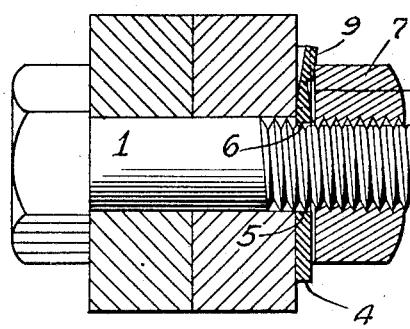
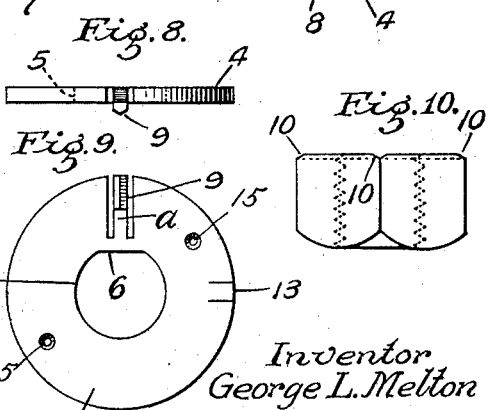
Inventor
George L. Melton
by
James R. Townsend
his atty.
Witness
W. N. Kirkby

UNITED STATES PATENT OFFICE.

GEORGE L. MELTON, OF PASADENA, CALIFORNIA.

NUT-LOCK.

1,358,690. Specification of Letters Patent. Patented Nov. 9, 1920.

Application filed July 11, 1917, Serial No. 179,960½. Renewed September 25, 1919. Serial No. 326,416.

*To all whom it may concern:*

Be it known that I, GEORGE L. MELTON, a citizen of the United States, residing at Pasadena, in the county of Los Angeles and State of California, have invented new and useful Improvements in Nut-Locks, of which the following is a specification.

An object of this invention is to provide for use in connection with automobiles, railway fish plates, bridge timbers, moving parts of machinery and for use in other situations, practical means whereby nuts on the bolts will be positively retained without danger of becoming loose from vibration, also to allow the nut to be unscrewed when desired, and again screwed tight and locked.

An object is to provide improved means for locking the nut at any position on the bolt so as to allow loose joints where required as in securing vehicle wheels on axles.

An object is to accomplish the foregoing objects without materially weakening the bolt and with the use of a simple cheap ratchet washer.

A feature of the invention is an improved washer non-rotatably mounted on the bolt and provided with improved means to engage the nut to prevent automatic or accidental turning thereof on the bolt.

A feature is the provision of an inner nut threaded on the bolt and engaged by the washer of special construction which is also engaged by the outer nut, thus to lock the nuts at any place on the threaded portion of the bolt.

The invention includes the combinations and also the nut-locking washer hereinafter set forth and claimed.

The invention may be applied in various ways and further objects, advantages and features of the invention may appear from the accompanying drawings, the subjoined detail description and the appended claims.

The accompanying drawings illustrate the invention.

Figure 1 is a view partly in section on line indicated at $x^1$, Fig. 2, of a bolt with lock applied thereto in accordance with this invention.

Fig. 2 is a view from the right of Fig. 1 omitting the outer nut.

Fig. 3 is a top view of the bolt as shown in Fig. 1.

Fig. 4 is a view analogous to Fig. 1, the section being on line indicated at $x^4$, Fig. 2.

Fig. 5 is a view of the inner side of the outer nut shown in Figs. 1 and 4.

Fig. 6 is a view partly in section showing the invention as applied with but one nut and the ratchet washer to hold two parts together.

Figs. 7 and 8 are edge elevations at different angles of the washer shown in the preceding views before application of the same to the bolt.

Fig. 9 is a view of the under side of the washer as shown in Figs. 7 and 8.

Fig. 10 is a side elevation of the outer nut shown in Fig. 5.

Fig. 11 is a fragmental side elevation of the appliance shown in Figs. 1 and 2 as the same may be constructed with rectangular notches.

The bolt 1 is threaded at 2 in the usual manner and has a longitudinal flattened face 3 extending along one side of the threaded surface. The washer 4 has an orifice conforming to the cross-sectional contour of the bolt; being for that purpose provided with a rounded margin 5 to conform to the threaded periphery of the bolt, and provided with a straight wall 6 to conform to the flattened face 3.

Nuts 7 and 8 adapted to screw upon the threaded portion of the bolts are provided, and both may be used; or in some instances only one may be used in conjunction with the washer. Means are provided whereby the outer nut 7 may rotate freely in one direction relative to the washer, but not in the other direction. Such means include a ratchet arrangement comprising a radial pawl or tongue 9 and notches 10. In the drawings the pawl 9 is formed as an integral part of the washer and the ratchet face is stamped or otherwise formed in the rear side of the outer nut. The ratchet tongue 9, which has its root adjacent to the flat side of the orifice 5, may be resilient or ductile according to the judgment of the manufacturer, and where the pawl is resilient a slanting engagement face is provided between the ratchet wall and the pawl. The sloping or bevel face for such engagement may be formed upon either the ratchet tongue or the notched face with which it engages.

The two elements, viz., the washer and the outer nut are applicable to the bolt in any situation where the inner face of the washer abuts against a stationary surface as a railway fish plate, a bridge timber or parts of an automobile or moving machinery; and in practical application with these two parts all that is necessary is to apply the washer to the protruding end of the bolt which has been inserted through parts to be fastened together, bringing the washer against the outer one of said parts and screwing the nut on the bolt home against the washer.

In case the ratchet tongue is resilient, it springs into the notches so as to prevent unscrewing of the nut and said nut can only be removed by retracting the ratchet tongue.

If the ratchet tongue is pliable, being made of malleable iron, or the like, the workman will bend it into or out of the notch, as required. It is desirable sometimes, however, to fasten a nut in such a manner that there will be lost motion between the nut and the part through which the bolt protrudes and that the nut-lock will hold the nut in the required position on the bolt. This construction is applicable for instance, to holding vehicle wheels on their spindles and will be understood by reference to Figs. 1 and 4 in which the inner nut 8 is shown screwed onto the bolt and is grooved and is thereby provided with catches 12 for engagement with the tooth 13 on the washer, and in practical use the inner nut 8 will be first screwed to the appropriate place on the bolt; then the washer 3 will be applied to the bolt and brought against the inner nut with its tooth 13 inserted in the seat 12 for the washer. Then the outer nut will be screwed home so as to cause the ratchet arrangement between the outer nut and the washer to engage, thus preventing back rotation of the outer nut.

The flat face 3 and the ratchet tongue 9, $a$, are both on the same side of the bolt hole and said tongue is radial to the axis of the washer, thus giving a considerable length to the tongue including the neck $a$ thereof so that there is less likelihood of the tongue becoming useless through loss of elasticity or permanent set.

The washer so engages the bolt by reason of the flat sides of bolt and hole in the washer, that bolt and washer are relatively non-rotatable. The tooth 13 is at an angle of about 45 degrees from the tongue 9 being thereby spaced to engage a flat side of a hexagon nut in which the ratchet grooves 10 radiate to the corners of the nut. By this arrangement the tongue may be engaged, the extended portion of the nut allowing a considerable length to the tongue; and at the same time the tooth 13 may be bent down to engage a flat side of the nut. The tooth 13 may be arranged at other angles to engage other flat sides of the nut in any manner adapted to carry out the principle of the invention in this respect.

In the operation of this combination the flat wall of the washer, engaging with the flat face 6 of the bolt, prevents rotation of the washer. The tooth engaging the seat in the inner nut prevents the inner nut from rotating; and the outer nut, engaging with the ratchet on the washer, prevents the loosening of the outer nut and retraction of the washer, with the result that when the parts are together as shown in Fig. 1, the outer nut can be unscrewed only by releasing the ratchet; and the inner nut can be unscrewed only after the washer has been withdrawn.

It is understood that the locking tongue 9 may be sufficiently resilient to act as a spring pawl and may also be sufficiently ductile to receive a permanent set.

In practical use, when the outer nut has been set the workman may, by a punch, give a permanent set to the tongue whether constructed as a spring or otherwise, or as partaking of both characters. The tongue 9 may be more or less cut away at the root, as indicated at $a$ in Figs. 7 and 9 so as to make it follow the ratchet face more freely.

Spanner-wrench seats 14 are provided in the outer face of the inner nut, so that said nut may be turned by a spanner-wrench.

The counter-sunk holes 15 in the washer are to receive points by which the washer may be withdrawn from the bolt when the outer nut has been unscrewed.

I am aware that attempts have been made in the art to construct washers with tongues having their roots at or near the periphery of the washer, but I have found that a washer of this kind is unsatisfactory in combination with a nut and a bolt for the purpose of locking the nut upon the bolt, because the root of the washer is so exposed that a comparatively light pressure thereupon will force the tongue out of engagement with the ratchet of the nut, thus easily causing accidental disengagement of the tongue and making a lock nut of this kind inoperative for practical purposes. Furthermore, it is extremely difficult to construct a tool that can reach back of the root so as to enable a person to force the tongue again into engagement with the ratchet, and a person, in order to cause the tongue to engage the ratchet of the nut, is therefore obliged to resort to the time-wasting operation of first loosening the nut from the bolt. Also, in certain washers of former constructions, in which a tongue extends circularly of the washer, a person depends upon a special tool for forcing the tongue out of engagement with the ratchet, so that, if such a tool is not immediately at hand, some loss of time results before the washer can be disengaged and the nut removed.

It is evident that, by my construction of the washer in combination with the bolt and the nut, not even a punch, as before stated, although access to such a tool is preferable, is absolutely depended upon for forcing the tongue in or out of engagement with the ratchet of the nut, as a person if he has no suitable tool within convenient reach, may use only a nail or even simply a wire stump for setting the tongue so as to make the locking of the nut permanent or for forcing the tongue out of engagement with the ratchet.

It is also clear that the root, which is hidden under the nut, can not be accidently forced to such an extent as to cause disengagement of the tongue from the ratchet.

I claim:—

1. A nut-lock comprising a threaded bolt having a longitudinal flattened face at its threaded part, a washer having an orifice conforming to the cross section of the bolt at said face and also provided with a radial tongue integral with the washer and having its root adjacent to said orifice so that the washer will not turn on the bolt; and a nut to screw onto the bolt, said nut being provided with a ratchet notch to coöperate with the tongue.

2. A nut-lock comprising a threaded bolt having a longitudinal flattened face at the threaded portion, a washer having an orifice conforming to the cross section of the bolt at said face so that the washer will not turn on the bolt; a nut to screw onto the bolt; said nut and washer being provided with ratchet means to allow the nut to be screwed home on the washer and to prevent accidental unscrewing of the nut; and an inner nut adapted to screw onto the threaded portion of the bolt, and interlocking with the washer.

3. In a nut lock comprising a nut having a ratchet or notched face; a washer having a radial tongue cut away at the root so as to make the tongue follow the ratchet or notched face freely.

4. In a nut lock comprising a ratchet nut and a bolt having a flattened face; a washer having an orifice with a straight edge conforming to the bolt; one side of said orifice being flattened and a radial tongue on the flattened face side of said washer, said tongue being integral with the washer and having its root adjacent to said side of the orifice.

5. In a nut-lock a washer having a radial tongue adapted to engage a nut, said washer also having means to prevent rotation on a bolt, and a tooth adapted to be bent down against a flat side of the nut.

6. A nut-lock element comprising a washer provided with a tongue struck up therefrom for engagement with the nut, and a tooth adapted to be bent against a flat side of the nut.

7. In a nut-lock, the combination with a bolt, of a washer non-rotatable thereon and provided with a radial tongue struck up therefrom, said tongue being integral with the washer and having its root adjacent to said bolt, and a nut threaded on the bolt and notched radial to its corners to engage said tongue.

8. In a nut-lock the combination with a bolt, of a washer so engaging the bolt that they are relatively non-rotatable, and said washer being provided with a tooth and a tongue; a nut threaded on the bolt at one side of the washer and having a seat for engagement with the tooth; and a nut threaded on the bolt at the other side of the washer and provided with a catch to engage the tongue.

In testimony whereof I have hereunto set my hand at Los Angeles, California, this 3rd day of July, 1917.

GEORGE L. MELTON.

Witness:
JAMES R. TOWNSEND.